No. 835,766. PATENTED NOV. 13, 1906.
H. F. STREHLOW.
FISH HOOK.
APPLICATION FILED JULY 5, 1906.
FIG. 1.
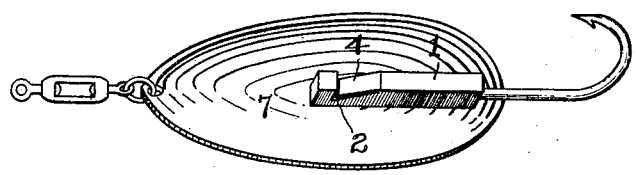
FIG. 2.
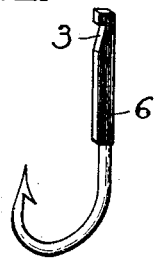
FIG. 3.
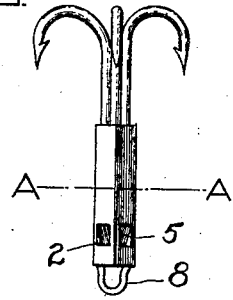
FIG. 6.
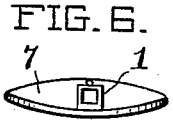
FIG. 4.
FIG. 5.
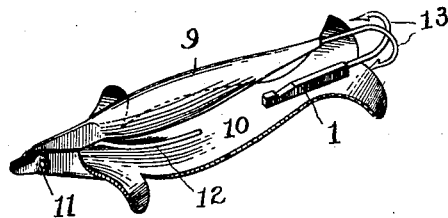
Witnesses:
William T. Hewitt
Jay Fuller
By his Attorney
Edward N. Pagelsen.
Inventor
H. F. Strehlow.

though I have described my device in connection with fish-hooks, it is apparent that it may be used as a connection between any two members, one of which is provided with an angular shank and the other with a cut-out portion and a spring-tongue.

UNITED STATES PATENT OFFICE.

HERMAN F. STREHLOW, OF CASSELTON, NORTH DAKOTA.

FISH-HOOK.

No. 835,766.

Specification of Letters Patent.

Patented Nov. 13, 1906.

Application filed July 5, 1906. Serial No. 324,727.

*To all whom it may concern:*

Be it known that I, HERMAN F. STREHLOW, a citizen of the United States, and a resident of Casselton, in the county of Cass and State of North Dakota, have invented a new and Improved Fish-Hook, of which the following is a specification.

My invention relates to interchangeable hooks; and the invention consists in a socket adapted to receive the enlarged shank of a hook, the socket being adapted to be secured direct to the fish-line or to an artificial bait, which socket is provided with means to engage the shank of the hook and securely hold the same.

In the accompanying drawings, Figure 1 is a view of an ordinary spoon-hook with my improvement secured thereto. Fig. 2 is a view of a hook provided with a square shank. Fig. 3 is a view of my improved socket adapted to hold three removable hooks. Fig. 4 is a cross-section on the line A A of Fig. 3. Fig. 5 is an improved artificial bait, with hooks secured thereto, with my improved device. Fig. 6 is an end view of the spoon shown in Fig. 1.

Similar reference-numerals refer to like parts throughout the several views.

When the hook proper of the ordinary spoon-hook is broken, it is ordinarily useless to try to repair the same, which is also true with other artificial bait. It is very desirable that some means be provided whereby a broken hook may be replaced. A device to accomplish this is illustrated in the accompanying drawings and consists generally of the sheath or socket 1, having a cut-out portion 2, the side of the sheath adjacent thereto being bent down to form a spring that will enter the notch 3 of the enlarged shank on the hook. This spring may be comparatively large, as shown at 4, or shorter, as at 5, its form being in each case especially adapted to the style of the hook to be engaged. The hook-shanks will be of any desired form, either square, as at 6 in Fig. 2, or triangular, as shown in Figs. 3 and 4. The sheath may be secured to a spoon 7 or to an eye 8, to which the line is attached.

In Fig. 5 I have shown an improved artificial bait, which is formed of two parts 9 and 10, pivoted together at 11 and normally held apart by the spring 12, secured to the part 10. The parts are provided with fins, as shown, which will cause the bait to revolve when pulled through the water. The two parts have each a sheath 1 to receive the hooks 13. The hooks are so positioned that their points will engage behind the rear ends of the parts 9 and 10, and so prevent the spring 12 from swinging the parts apart; but when a fish strikes the parts 9 and 10 will be pressed together and the hooks will project sufficiently to hook into the fish.

To remove a hook from the artificial bait, it is necessary only to insert the point of a knife-blade under the tongue 4 and raise it out of the notch in the hook-shank, when the hook may be easily removed. It will be seen that this method of securing a hook may be employed with almost all the various types of artificial bait now on the market.

Having now explained my improvement, what I claim as my invention, and desire to secure by Letters Patent, is—

1. In a fish-hook, the combination of the hook provided with an angular shank having a notch, an angular sheath or socket for said shank having a spring-tongue adapted to engage in said notch to secure the shank in the sheath, and means connected to said sheath adapted to have a line secured thereto.

2. The combination of a fish-hook provided with an angular shank having a notch, an angular sheath or socket for said shank having a spring-tongue adapted to engage in said notch to secure the shank in the sheath, and an artificial bait secured to said shank and adapted to have a line secured thereto.

3. In a duplex fish-hook, the combination of an angular shank of a hook provided with a notch, a sheath for said shank provided with a spring-tongue to engage in said notch and secure the shank in the sheath, a bait-representing plate attached to said sheath, a shank for another hook and an elongated spoon attached thereto, said plate and elongated spoon being hinged together, and a spring secured to one of said hinged members and pressing against the other.

4. In a fish-hook, the combination of a shank having a notch, a sheath for the same provided with a tongue to engage in said notch, a bait-representing plate attached thereto, said plates being hinged together, and a spring to hold them separated.

In testimony whereof I have signed my name to this specification in the presence of two subscribing witnesses.

HERMAN F. STREHLOW.

Witnesses:
J. E. HEDLUND,
H. C. ANDERSON.